Aug. 22, 1933.                F. FRELIN                1,923,717
                            OILING DEVICE
                         Filed Dec. 22, 1932

INVENTOR.
Fritjof Frelin.
BY
HIS ATTORNEY.

Patented Aug. 22, 1933

1,923,717

UNITED STATES PATENT OFFICE 1,923,717

OILING DEVICE

Fritjof Frelin, Phillipsburg, N. J., assignor to Ingersoll-Rand Company, Jersey City, N. J., a Corporation of New Jersey Application December 22, 1932
Serial No. 648,427

5 Claims. (Cl. 184—6)

This invention relates to engines, and more particularly to an oiling device for wrist pins employed for connecting the piston of an engine to its piston rod.

One object of the invention is to assure an ample supply of lubricant to the cooperating surfaces of a wrist pin and the elements wherein it is journalled.

Another object is to assure against leakage of oil from the wrist pin to other elements of the organization of which the wrist pin forms a part.

Other objects will be in part obvious and in part pointed out hereinafter.

Figure 1:
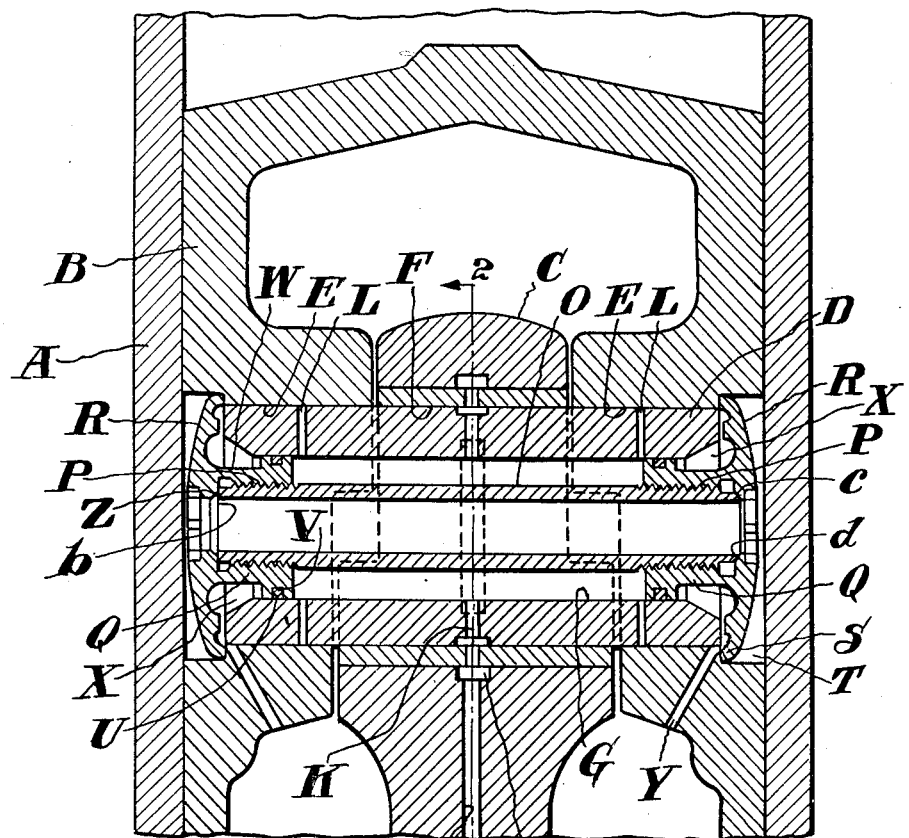
Figure 2:
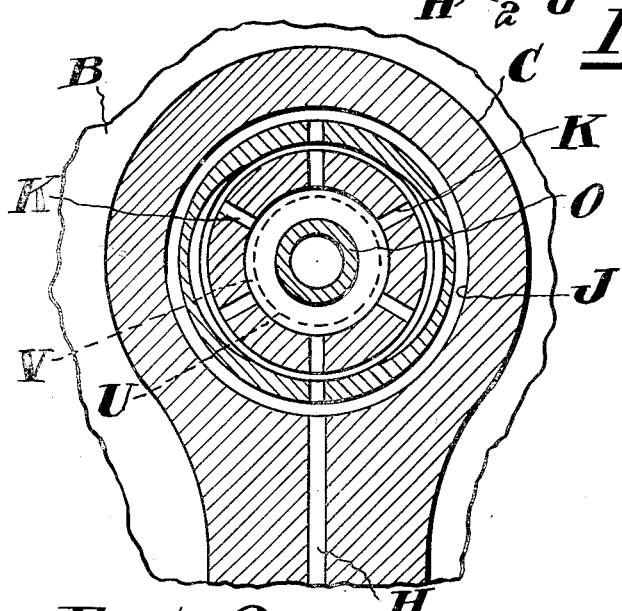

In the drawing illustrating one form which the invention may assume in practice and in which similar reference characters refer to similar parts, Figure 1 is a sectional elevation of a piston and a connecting rod having the invention applied thereto, and Figure 2 is a transverse view taken through Figure 1 on the line 2—2 looking in the direction indicated by the arrows.

Referring more particularly to the drawing, A designates the cylinder of an engine and B a reciprocatory piston arranged within the cylinder. A connecting rod C is connected to the piston by a wrist pin D seated with its ends in bores E in the piston and extending through a bore F in the connecting rod, in a well understood manner.

The wrist pin D, which may be of the full floating type, is provided with a longitudinal bore extending entirely therethrough to provide a chamber G for oil whereby the cooperating surfaces of the wrist pin D and the elements wherein it is arranged may be lubricated. Such oil is conveyed to the chamber G from a suitable source of supply under pressure (not shown), by a passage H in the connecting rod. The passage H may, as shown, open into an annular groove J within the connecting rod C and which groove surrounds an intermediate portion of the wrist pin. From the groove J the oil passes through passages K in the wrist pin D into the chamber G. The wrist pin D is, moreover, provided with a series of outlet passages L through which the oil flows from the chamber G to the bores E.

In order to maintain the weight of oil required for filling the chamber G and, therefore, the overall weight of the piston assembly at a low value, a hollow sleeve O is disposed within the chamber G so that the chamber G is, in effect, of annular shape.

The ends of the sleeve O are provided with exterior threads P to accommodate internally threaded hollow plugs Q which extend into the ends of the chamber G. On the outer ends of the plugs Q are laterally extending flanges R which seat against the bottoms S of recesses T in the sides of the piston B to form seals around the outer ends of the bores E.

The flanges R are preferably of thin cross sectional area so that, upon threading the plugs Q on the sleeve O, the flanges may be flexed somewhat and thus exert a binding effect upon the sleeve O to prevent separation of these elements. By rendering the flanges R flexible said flanges may also yield readily in accordance with the expansive and contractile movements of the piston B and the sleeve O as a result of variations in the temperature of these elements.

In order to minimize the degree of leakage of oil between the cooperating surfaces of the plugs Q and the wrist pin D the said plugs are provided, near their inner ends, with peripheral grooves U to accommodate expansible rings V which bear against the inner surface of the wrist pin D.

As a preferred form of construction the plugs Q are provided with external grooves W the walls of which cooperate with the adjacent surfaces of the flanges R and the wrist pin D to form pockets X into which oil leaking along the plugs Q from the chamber G may flow. Suitable outlets are provided for the pockets X in the form of passages Y in the piston B and through which leakage oil may be drained from the pockets X into the interior of the piston, whence it may flow to the crank pan of the engine.

In order that such oil as may find its way along the threaded portions of the plugs Q and the sleeve O may be prevented from passing to the exterior of the wrist pin assembly an end Z of the sleeve O is seated flush against the adjacent surface $b$ of the flange R. The opposite end of the sleeve O has a tapered surface $c$ which seats upon a correspondingly tapered surface $d$ of the adjacent plug Q. The portion of the sleeve O upon which the tapered surface $c$ is formed is preferably of thin section so that it may flex or yield somewhat and thus assure a thorough binding and sealing effect between the surfaces $c$ and $d$.

From the foregoing description it will be apparent that an ample supply of lubricant will at all times be supplied to the contacting surfaces of the wrist pin, the piston and the connecting rod, and that the pressure under which the lubricant is delivered to the chamber G will not be diminished by leakage through passages other than those intended for conveying the lubricant to the bearing surfaces. It will, moreover, be apparent that, by connecting the plugs Q by means of the sleeve O, the chamber G for which the sleeve acts as a bounding surface, will be of comparatively small capacity and the overall weight of the wrist pin will be considerably less than if the entire interior of the wrist pin were employed as a reservoir for oil.

I claim:

1. An oiling device, comprising a wrist pin having a bore and inlet and outlet passages, means within the bore to define an annular chamber therein for oil, closure means in the ends of the chamber and being threadedly connected to the first said means, packing devices in the closure means for sealing the ends of the chamber, and sealing surfaces on the first said means and the closure means cooperating to prevent leakage of oil through the closure means.

2. An oiling device, comprising a wrist pin having a bore and inlet and outlet passages, a sleeve within the bore to define an annular chamber therein for oil, hollow plugs threaded on the ends of the sleeve and extending slidably into the bore, packing devices in the plugs cooperating with the wall of the bore to seal the ends of the chamber, and sealing surfaces on the sleeve and the plugs cooperating to prevent leakage of oil through the plugs.

3. An oiling device, comprising a wrist pin having a bore and inlet and outlet passages, a sleeve within the bore to define an annular chamber therein for oil, hollow plugs threaded on the ends of the sleeve and extending into the bore, there being cooperating sealing surfaces on the sleeve and the plugs to prevent leakage of oil through the plugs, and expansible rings in the plugs seating against the wall of the bore to seal the ends of the chamber.

4. In an oiling device, the combination of a piston and a connecting rod, a wrist pin in the piston having a bore and inlet and outlet passages, a sleeve within the bore to define an annular chamber therein for oil, hollow plugs threaded on the ends of the sleeve and extending into the bore, flanges on the plugs seating against the piston, there being cooperating sealing surfaces on the plugs and the sleeve to prevent leakage of oil through the plugs, and expansible rings in the plugs seating against the wall of the bore to seal the ends of the chamber.

5. In an oiling device, the combination of a piston and a connecting rod, a wrist pin in the piston having a bore and inlet and outlet passages, a sleeve within the bore to define an annular chamber therein for oil, hollow plugs threaded on the ends of the sleeve and extending into the bore, there being cooperating surfaces on the sleeve and plugs to prevent leakage of oil through the plugs, flanges on the plugs abutting the piston and cooperating with the piston, the plugs and wrist pin to provide pockets for intercepting oil leaking from the annular chamber, and passages in the piston for draining oil from the pockets.

FRITJOF FRELIN.